(12) United States Patent
Wickliffe (10) Patent No.: US 9,785,937 B2
(45) Date of Patent: Oct. 10, 2017

(54) COMPUTER ENABLED METHODS AND SYSTEMS FOR FACILITATING MICROPAYMENTS VIA PUBLIC NETWORKS

(71) Applicant: Paul Wickliffe, Warren, NJ (US)

(72) Inventor: Paul Wickliffe, Warren, NJ (US)

( * ) Notice: Subject to any disclaimer, the term of this patent is extended or adjusted under 35 U.S.C. 154(b) by 1009 days.

(21) Appl. No.: 13/873,867

(22) Filed: Apr. 30, 2013

(65) Prior Publication Data

US 2013/0290174 A1    Oct. 31, 2013

Related U.S. Application Data

(60) Provisional application No. 61/640,224, filed on Apr. 30, 2012.

(51) Int. Cl.
  *G06Q 20/36* (2012.01)
  *G06Q 20/22* (2012.01)
  (Continued)

(52) U.S. Cl.
  CPC ......... *G06Q 20/3674* (2013.01); *G06Q 20/29* (2013.01); *G06Q 20/401* (2013.01);
  (Continued)

(58) Field of Classification Search
  CPC .... G06Q 20/12; G06Q 20/10; G06Q 30/0601; G06Q 20/04; G06Q 20/29; G06Q 20/367;
  (Continued)

(56) References Cited

U.S. PATENT DOCUMENTS 5,809,144 A * 9/1998 Sirbu ............... G06Q 20/04
                                              380/282
5,826,241 A   10/1998 Stein et al.
              (Continued)

FOREIGN PATENT DOCUMENTS

EP        2091202       8/2009
WO    WO2008033656 A1   3/2008
              (Continued)

*Primary Examiner* — Mamon Obeid
*Assistant Examiner* — Edgar R Martinez-Hernand
(74) *Attorney, Agent, or Firm* — Gearhart Law LLC (57) ABSTRACT

A computer enabled system for facilitating electronic micropayments in which an accounting application receives a vendor submission a remote vendor server via a public communications network. This includes identifiers for the vendor, the customer and an item selected by the customer. The accounting application then checks the status of the customer's account. If it has sufficient funds, the transaction proceeds. The customer account is conditionally debited, and the vendor account conditionally credited with the transaction amount, including fees. A transaction confirmation is sent to the vendor application which then confers usage rights for the item to the customer. The accounting application periodically reconciles the vendor and customer accounts, deducts any service fees, and makes a single payment to each vendor. This single payment only incurs a single per-transaction credit-card company fee, thereby spreading it across multiple purchases and clients, making micro-transactions profitable.

4 Claims, 3 Drawing Sheets

(51) Int. Cl.
*G06Q 20/40* (2012.01)
*H04L 9/30* (2006.01)
*H04L 9/32* (2006.01)
*H04L 9/08* (2006.01)

(52) U.S. Cl.
CPC .......... *H04L 9/0816* (2013.01); *H04L 9/3026* (2013.01); *H04L 9/3093* (2013.01); *H04L 9/3226* (2013.01)

(58) Field of Classification Search
CPC ............ G06Q 20/123; G06Q 30/0222; G06Q 30/0613; G06Q 30/0641; G06Q 20/02; G06Q 20/145; G06Q 20/40; G06Q 30/00; G06Q 30/018; G06Q 30/0185; G06Q 40/12; G06Q 50/188; G06Q 20/30; G06Q 20/36; G06Q 20/3674; G06F 17/11; H04L 9/0816; H04L 9/3226; H04L 9/0861; H04L 9/088; H04L 9/3026; H04L 9/3093
USPC .......................................................... 705/64
See application file for complete search history.

(56) References Cited

U.S. PATENT DOCUMENTS

| | | | | |
|---|---|---|---|---|
| 6,029,150 A * | | 2/2000 | Kravitz | G06Q 20/02 705/39 |
| 6,876,979 B2 | | 4/2005 | Ling | |
| 7,177,838 B1 | | 2/2007 | Ling | |
| 7,210,620 B2 * | | 5/2007 | Jones | G06Q 20/40 235/380 |
| 7,249,060 B2 * | | 7/2007 | Ling | G06Q 30/0277 705/14.73 |
| 7,249,099 B2 | | 7/2007 | Ling | |
| 7,328,189 B2 | | 2/2008 | Ling | |
| 7,376,621 B1 | | 5/2008 | Ling | |
| 7,415,439 B2 * | | 8/2008 | Kontio | G06F 21/10 705/51 |
| 7,421,583 B1 * | | 9/2008 | Berson | G06Q 20/085 380/255 |
| 7,529,770 B2 | | 5/2009 | Dzeko et al. | |
| 7,676,432 B2 | | 3/2010 | Ling | |
| 7,882,021 B2 * | | 2/2011 | Baumgartner | G06Q 20/04 705/35 |
| 8,099,365 B2 | | 1/2012 | Bhambri et al. | |
| 2005/0198535 A1 | | 9/2005 | Basche et al. | |
| 2007/0260547 A1 * | | 11/2007 | Little | G06Q 20/12 705/52 |
| 2008/0005027 A1 * | | 1/2008 | Mullins | G06F 21/10 705/51 |
| 2010/0325051 A1 * | | 12/2010 | Etchegoyen | G06F 21/10 705/54 |

FOREIGN PATENT DOCUMENTS

| | | |
|---|---|---|
| WO | WO2009035824 A2 | 3/2009 |
| WO | WO2010092017 A1 | 8/2010 |
| WO | WO2011084835 A2 | 7/2011 |

* cited by examiner

COMPUTER ENABLED METHODS AND SYSTEMS FOR FACILITATING MICROPAYMENTS VIA PUBLIC NETWORKS

CLAIM OF PRIORITY

This application is a US utility patent application claiming priority from U.S. provisional application 61/640,224 filed on Apr. 30, 2012, the contents of which are fully incorporated by reference.

FIELD OF THE INVENTION

This invention relates to systems and methods for electronic payments made via computers, and more particularly to systems and methods for electronic micro-payments made by computer over public, electronic networks.

BACKGROUND OF THE INVENTION

Over the past few decades, robust online commercial marketplaces have developed, selling a wide variety of goods and services. A key enabler of these markets has been public key encryption systems such as, but not limited to, the RSA public key encryption that allows secure transactions, including secure monetary exchanges to occur even over insecure, public communications network. This has allowed customers and vendors to use established forms of payment for goods or services that are bought or sold on line. Credit cards, in particular have become a widely used means of monetary transaction on the Internet. Even seemingly stand-alone payment service providers such as, but not limited to, PayPal™, typically rely on charging user credit cards.

On-line markets can aggregate enormous numbers of potential customers from a very wide geographical catchment area, so it is no surprise that Internet commerce continues to grow rapidly. There are, however, elements of the current transaction paradigm that limit the type of products that can be traded economically over the Internet.

One particular limit is the per-transaction price point at which it is economical for a vendor to make an online sale, even of a digitally reproduced product, such as music, that has virtually no reproduction or delivery costs. This arises, in large part, because of the way that credit card companies usually operate. They typically make their profits in two ways.

First, they may charge the vendor a percentage of the transaction amount, usually in the range of 3-5% of the value of the transaction.

Second, they may also charge the vendor a "per-transaction fee" for processing the payment. This per-transaction fee is typically about 25 cents. While a negligible percentage of a $100 purchase, on an item costing $10 or less this per-transaction fee may equal or exceed the percentage-based portion of the credit card company's cut.

Digitally reproducible goods, such as digital audio, video, text and all forms of online publishing, are particularly good candidates for selling via the Internet because additional digital copies cost virtually nothing, and the low distribution overheads are typically absorbed by the consumer.

In principle, a producer of songs, films or books, should be able to use online market places as an effective means of recouping the often significant cost of producing the original work by selling enormous amounts of digitally reproduced copies at a low price.

There are two problems to this simplistic view: the credit card companies' per-transaction fees and piracy.

The per-transaction fee puts a lower limit on the price that can be charged by a viable business. Apple™ i-Tunes™, for instance, is able to charge 99 cents per song, and has found this to be a price point at which they can make money, but they account for only about 5% of music downloaded, so it appears that the great majority of music listeners consider that even this price is excessive. According the International Federation of the Phonographic Industry, the majority of online music is still downloaded for nothing, either from friends, or from pirate websites. In the absence of what customers consider to be fairly priced music, piracy has decimated the industry. Over the last decade the world wide music industry has seen an inflation adjusted decline in total revenues of over 33%—and the trend continues downward.

Wide spread availability of high-speed Internet services with its larger bandwidth and new and innovative ways of distributing large quantities of digital content such as, but not limited to, bit-torrent distribution, are beginning to make pirating a problem even for film producers.

One approach to solving this problem is to attempt to eliminate pirating through better encryption software, improved hardware protection, harsher laws and tighter law enforcement. None of these, however, seem to have made much of a dent on music piracy.

Another approach, facilitated by this invention, is to improve digital payment systems so that vendors can profitably charge very low prices per item and customers can safely and easily make micro-payments. If micro-charges of a few cents per item are made viable, producers can, using well-organized websites, sell their products at prices that make even pirating for free too much effort. In this way, they can spread the cost of creating the original over a sufficiently greater number of customers that they still make a profit. Pirates will become obsolete because even pirated video distribution requires paying for web-hosting, and therefore pirate websites such as PirateBay™ typically rely on advertising. The legitimate sellers that provide low priced, conveniently available content may attract more paying customers rather than those who currently choose pirating over high prices. Without enough user traffic, pirates won't obtain enough advertising revenue to pay their bills. Piracy may not disappear, but at least become a minor distraction to legitimate companies that may have two streams of income—advertising and micro-payments. Or it could enable online publishers to rely solely on micro-payments and not have their content limited by their advertisers.

The system and method of this invention may allow a vendor to bundle purchases across both an individual buyer's purchases, and across multiple different buyers' purchases. This may mean all the purchases may be settled with a single credit card transaction, with only one per-transaction fee—effectively spreading that per-transaction fee across a significant number of purchases. This may allow a vendor to profitably make micro-charges of the order of 1 cent or less per item, enabling selling at both very low prices and a very fine granularity of content, such as, but not limited to, sales on a per-sentence, or per word, basis for articles, jokes or horoscopes, a per-image basis for cartoons, even a per-pixel basis for images, or some combination thereof.

DESCRIPTION OF THE RELATED ART

The relevant prior art includes:

US Patent Application no. 20080005027 by Mullins published on Jan. 3, 2008 entitled "System and methods for transmission of media files across a telephone, internet, intranet, satellite, cable or combination network to avoid unpaid digital file sharing or copying" that describes a business method, computer system and software implemented methods that provide for secure and high speed transmission or distribution of media files across a telephone, internet, intranet, satellite, cable or combination network decoupled from digital media file access rights, and a method to avoid digital file sharing or copying without direct or indirect payment of user fees. More particularly, the invention includes the use of a proprietary encryption technique for digital media files, a proprietary reassembly process for digital media files and unique user keys, wherein the access to a digital media file or portion thereof is controlled by the digital media rights of the key or digital media access card, which access may be constrained to a particular machine, a particular user, a particular period of time, or a combination thereof. This method permits peer to peer transmission of information without piracy of the media, such that access can be paid for by a third party or can be paid for by end user, and digital media rights licenses may optionally provide for a transfer of digital media rights for a particular digital media file.

U.S. Pat. No. 6,405,177 by DiMattina issued on Jun. 11, 2002 entitled "System for securing commercial transactions conducted on-line" that describes an on-line business method which will enable on-line retailers to offer the following on-line financial guarantee services to their customers: the financial guarantee of a secure credit card transaction; the financial guarantee of a genuine product at the advertised purchase price; the financial guarantee of the delivery and return policy of the item being purchased; and the financial guarantee that the implied or specific warranty of the item purchased will be honored. All of the above services are offered as a one-click point of sale solution.

US Patent Application no. 20070260547 submitted by Little, published on Nov. 8, 2007 and entitled "System and Method for Purchasing Digital Content" that describes a system whereby a merchant can offer digital content online and receive payment from consumers thereof where the merchant has established at least one online account to receive payments and has associated same with a merchant user device. The merchant provides digital content for offer to consumers online, and an online micro-payment facility receives a consumer request to purchase digital content. Upon verifying receipt of valid payment, the facility transfers the payment, or portion thereof, to the merchant's online account. The merchant retrieves the payment, or portion thereof, upon presentation of the merchant user device to a facility operably connected to the online account.

U.S. Pat. No. 7,529,770 by Dzeko et al. issued on May 5, 2009 entitled "Method for protecting a proprietary file" that describes a file containing proprietary content that can be protected against unauthorized duplication via file sharing between remote computers connected to an Internet swapping service. To this end, the content to be protected is searched on the Internet, at least the hash ID of each data record offered as a search hit is stored, this hash ID is linked to substitute content data, and queries of remote computers for the file to be protected are responded to by offering the modified data record.

Various implements are known in the art, but fail to address all of the problems solved by the invention described herein. One embodiment of this invention is illustrated in the accompanying drawings and will be described in more detail herein below.

SUMMARY OF THE INVENTION

The present invention relates to computer enabled systems and methods for facilitating electronic micropayments.

In a preferred embodiment, an accounting application, that may be operable on an accounting server, includes instructions that enable the accounting server to perform a multiplicity of functions related to facilitating the processing of micropayments.

The accounting application may, for instance, receive a vendor submission sent from a vendor application operating on a vendor server. In a preferred embodiment, the accounting server may be remote from the vending server, and the vendor submission may have been sent via a public communications network. In a preferred embodiment, all transactions over public networks may be encrypted using suitable public key encryption systems that are widely available.

The vendor submission may, for instance, include identification numbers or code including a vendor-identifier, a customer-selected-item identifier and a customer-identifier.

The customer-identifier may have been obtained from a customer's computer or other communication device that the customer used to select an item at an online site hosted by the vendor. In a preferred embodiment, the customer-identifier may have been received via a public communications network from a customer application operating on a customer device. This customer-identifier may be obtained when the vendor application receives an instruction from the customer application indicating a customer's intention to buy, or otherwise obtain use of, a customer-selected item. In a preferred embodiment, the customer device is typically remote from both the accounting server and the vendor server.

Having received a vendor submission, the accounting application may then check the status of the customer-account associated with the customer-identifier. If the customer's account is deemed to be satisfactory, i.e., typically meaning that the account has sufficient funds to cover the intended purchase, then the transaction may proceed.

In a preferred embodiment, proceeding typically consists of the accounting application conditionally debiting the customer account by a monitory amount related to the customer-selected item, i.e., typically the selling price of the selected item. The accounting application may then also conditionally credit the vendor account by a second monitory amount. This amount is also typically the selling price of the selected item.

Having conditionally recorded the transaction, the accounting application may then transmit a transaction confirmation to the vendor application. Once the vendor application receives this confirmation, they may then complete the sale, i.e., confer the pre-determined usage rights regarding the selected item to the customer, The accounting application may conditionally record vendor and customer credits and debits and then periodically reconcile those accounts. Once the accounts are reconciled, the accounting application may make a single payment to a vendor. This single payment to the vendor may, for instance, include multiple item sales to multiple customers. However, since it is a single reconciled payment, it will, if made by a credit card company transaction, only incur a single per-transaction fee, thereby effectively spreading the one per-transaction fee across multiple purchases and clients. As with most other transactions, payments will occur using suitable encryption technology.

Similarly, the accounting application may only bill a customer or a vendor when their reconciled bill either exceeds a pre-agreed amount, or their available credit with the accounting application falls below a certain threshold.

Therefore, the present invention succeeds in conferring the following, and others not mentioned, desirable and useful benefits and objectives.

It is an object of the present invention to provide an online payment system that makes micro-payments viable for both vendors and customers.

It is another object of the present invention to provide a cost, efficient manner for both vendor and customer to process such micro-payments.

Yet another object of the present invention is to allow products that are now being given away for free to be purchased at an appealingly low price.

Still another object of the present invention is to circumvent the choke hold of transaction fees that banks and credit card companies have on e-commerce that currently make purchases of less than ten dollars unprofitable.

Still another object of the present invention is to create an alternative to the advertising revenue model, so as to allow writers, artists and producers greater freedom of expression and to attract more traffic.

Yet another object of the present invention is to monetize content at a price point cheap enough that stealing it is no longer worth the effort.

Still another object of the present invention is to make sure everyone who deserves to get paid, gets paid.

DESCRIPTION OF THE PREFERRED EMBODIMENTS

The preferred embodiments of the present invention will now be described with reference to the drawings. Identical elements in the various figures are identified with the same reference numerals.

Various embodiments of the present invention are described in detail. Such embodiments are provided by way of explanation of the present invention, which is not intended to be limited thereto. In fact, those of ordinary skill in the art may appreciate upon reading the present specification and viewing the present drawings that various modifications and variations may be made thereto.

Figure 1:
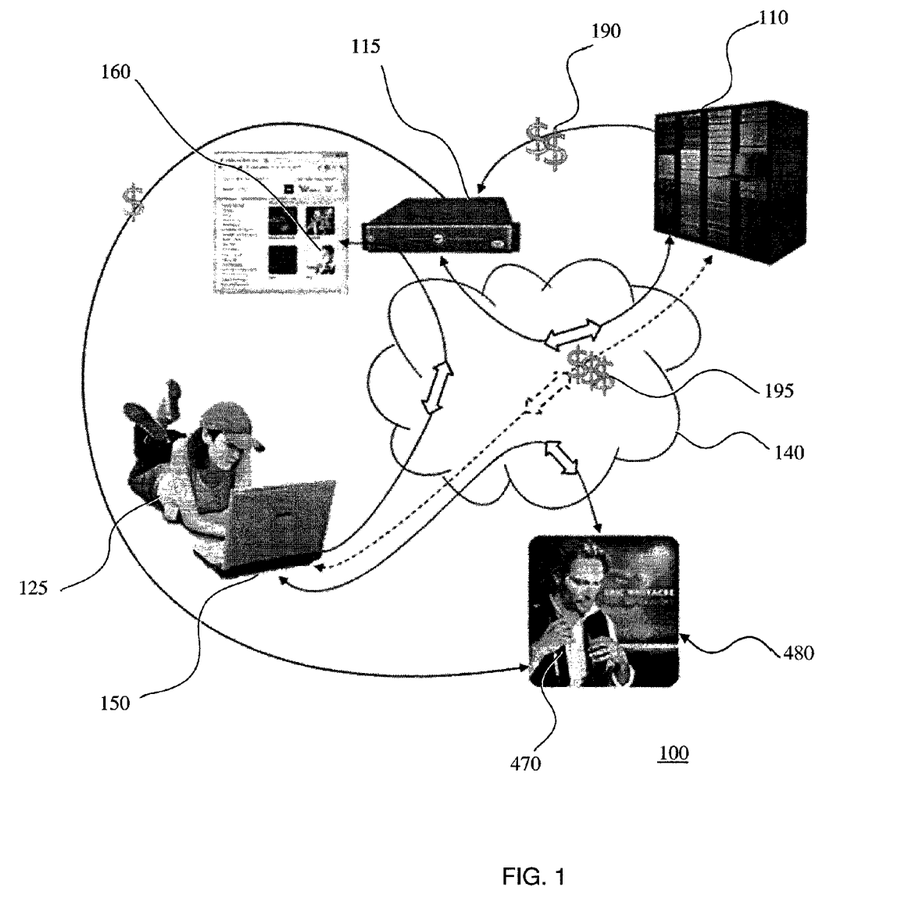
FIG. 1 shows a schematic overview of a computer enabled system for facilitating micropayments of the present invention.

FIG. 1 shows a schematic overview of a computer enabled system for facilitating micropayments of the present invention.

In a preferred embodiment of the present invention, a customer 125 may use a customer device 150 to access, via a public communications network 140, a website being hosted by a vendor server 115. The customer 125 may, for instance, locate a particular customer-selected item 160 that they would like to buy, download, or acquire the right to use. The customer may indicate their desire for the customer-selected item 160 by an action such as, but not limited to, a single click of a button located in a vicinity of a description or depiction of the item, by tapping on a touch-screen displaying the item or by some similar or related interaction facilitated by a user interface.

In a preferred embodiment, this single action, such as, but not limited to, a single mouse click on a button icon, may be all that is necessary to initiate the entire sequence of actions that leads to the transaction being completed. Furthermore, all transactions may be suitably encrypted using systems such as, but not limited to, public key encryption. Such encryption may vary in strength for different transactions, with the level of the security being matched to the nature of each transaction, and to attempt to optimize the tradeoffs between the level of security required and other factors such as, but not limited to, ease of use, available bandwidth and available computing. Such encryption technology is well known and widely implemented.

For example, when the customer initially establishes their account with Quikclix, they create an account password containing a minimum number of five letters and five numerals. The Quikclix server then generates a polynomial equation using the numerical portions of the client's password, plus adding several variables. The equation is embedded in the client's application software and stored on the customer's devices, as well as the Quikclix billing server. When the customer clicks the item to be purchased during the Initiation phase, the vendor's server returns a time stamp for the transaction to the customer's device. The customer device uses numerical portions of the time stamp to replace the variables in the equation and solves the equation. The numerical solution is returned to the vendor as a component of the password data that is then forwarded to the Quikclix billing server. The billing server will read the same vendor time stamp and will solve the same equation. When the solutions match, the transaction proceeds. If not, the purchase is denied. Even if it is possible to hack into the transaction to find the numerical solution to the equation, the solution will change with the next transaction as every time stamp is numerically unique and will not occur again. There are also an infinite number of equations that would render the same solution with the same time stamp, but only one will only work one second later. Given the small purchase price and the random nature of a given customer's purchasing habits, hacking individual accounts will not be worthwhile.

For example, a time stamp consists of: Year:Month:Day:Hour:Minute:Second. A client password could be: 112w36stnyc. The generated equation could be: 11(Hour+Minutes)+23(Year−Seconds)/6(Day)=[Solution]. The dynamic encrypted password would be wstnyc[Solution]. The security in the system is that no fixed password is transmitted, only the solution to a mathematical problem that only the client and host know and the variables are provided by the vendor.

The vendor server 115 may for instance run a module that, on receiving the single click, queries a software module running on the customer device 150 to obtain information that identifies the customer 125 and the customer device 150. This customer identification information may then be relayed on from the vendor server 115 to an accounting module running on an accounting server 110, along with information identifying the vendor and the item selected by the customer.

Once the software operating on the accounting server 110 has verified the identities of the customers and the vendor, and that the customer has an account with a sufficient balance to fund the transaction, i.e., to pay for the purchase of the customer-selected item 160, an authorization message may be sent to the vendor server 115. Once the authorization message is received at the vendor server 115, the customer device 150 may be sent a further authorization message. This further authorization message may then allow the customer device 150 to connect to a content provider 480 and download the content 470 corresponding to the customer-selected item 160.

In a preferred embodiment of the present invention, vendor payments 190 from the accounting server 110 to the vendor server 115 may not be made after each vendor sale to a customer. Instead, the accounting server 110, and the processing modules associated with it, may keep conditional accounts. At intervals, that may, for instance, be regular, predetermined intervals such as, but not limited to, one a day, once a week or once a month, the accounting server 110 may reconcile the conditional accounts and then made full payment to the vendor in a single transaction. If this payment transaction is made via a credit card account, there will only be one per-transaction fee that will effectively be spread over all the vendor sales made during the reconciliation interval. This may include multiple sales to single customers, as well as sales to multiple customers. By spreading the per-transaction fee over a substantial number of transactions, it may be profitable for the vendor to accept micro-payments from customers, where micro-payments may be as small as, but are not limited to a cent, or a fraction of a cent per item.

The vendor may similarly bundle sales to content providers 480 and only make a payment to the content provider when the credit-card company's per-transaction fee may effectively be spread over a significant number of individual sales.

In an alternate embodiment of the present invention, the payments to the content provider 480 may be made directly from the accounting server 110 thereby allowing the per-transaction fee to be spread over multiple vendors and multiple customers.

The customer 125 may also only make periodic payments 195 to the accounting server 110 thereby effectively bundling multiple individual micro-payments into a single credit card transaction that only incurs a single per-transaction fee.

Actual cash, or cash equivalent, transactions may be one aspect of the implementation of the invention requiring more stringent levels of encryption in order to ensure customer acceptance of the method and system of this invention.

Figure 2:
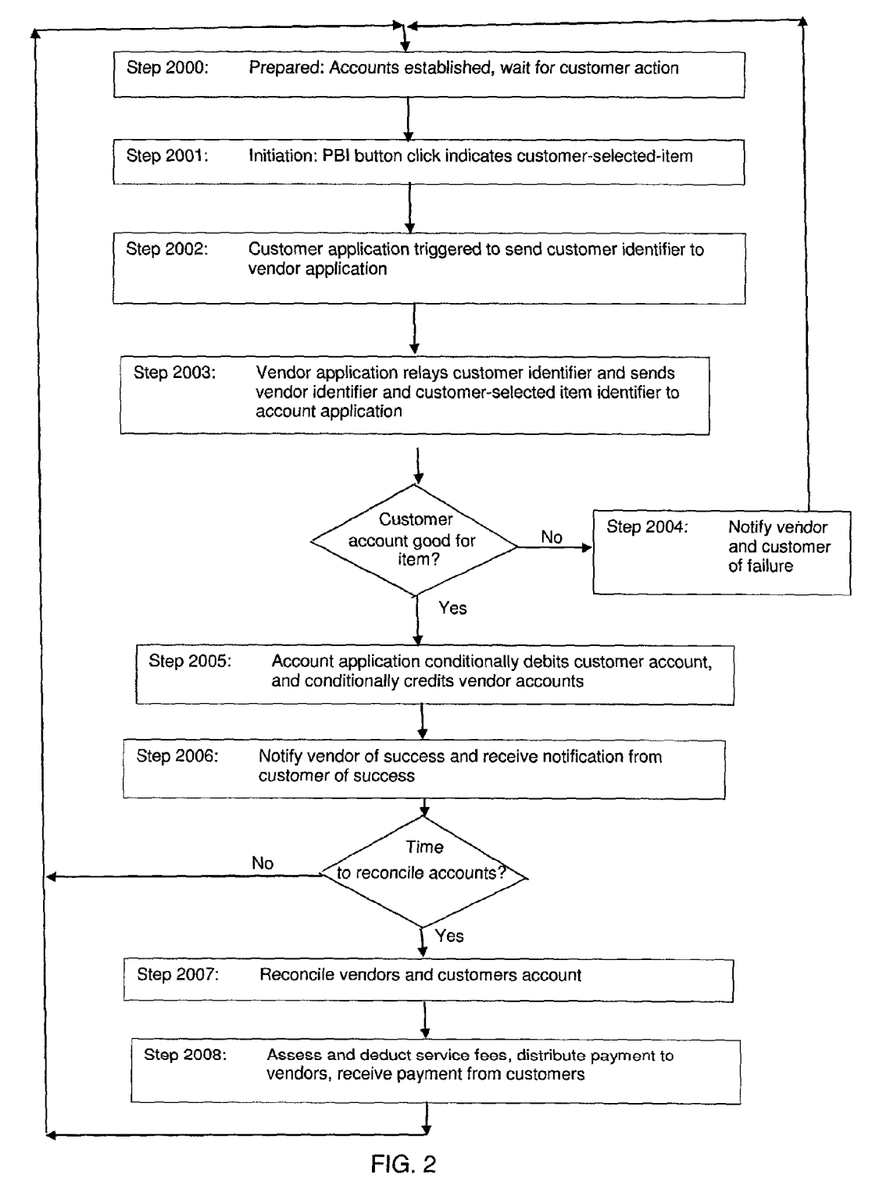
FIG. 2 shows a flow diagram of some of the steps involved in the computer enabled method for facilitating micropayments of the present invention.
Figure 3:
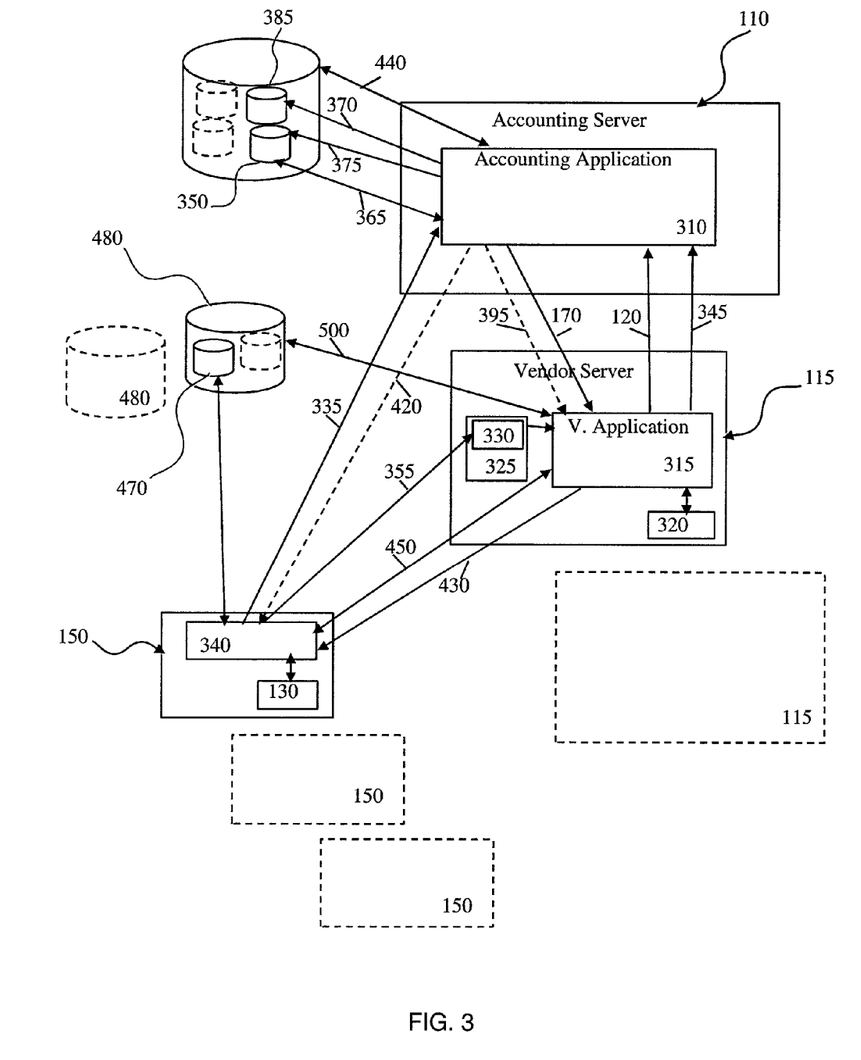
FIG. 3 shows a schematic of one embodiment of a computer enabled method for facilitating micropayments of the present invention.

FIG. 2 shows a flow diagram of some of the steps involved in the computer enabled method for facilitating micropayments of the present invention, with many of the detailed items of each step being shown in FIG. 3.

Step 2000: Prepared: Accounts established, wait for customer action.

In this step an accounting application 310 that may be operable on an accounting server 110 may be waiting, ready to receive a vendor submission 120. At step 2000, both customer-accounts 350 and vendor accounts 385 may have already been established. A customer-account 350 may, for instance, have been created by a customer application 340, running on a customer device 150, interacting with the accounting application 310 and establishing the customer account 335. In a preferred embodiment, an established customer account may be one in which the customer has funded, or has agreed to fund, the account with a minimum required balance from which future debits may be deducted.

Step 2001: Initiation: Purchase Button Icon (PBI) button click indicates customer-selected-item. In this step, a customer 125 may be using a customer application 340 running on a customer device 150 in order to access a vendor website 325 running on a remotely located vendor server 115. The customer 125 may, for instance, locate an item that they wish to acquire. This item may, for instance, be digital content or a digital service such as, but not limited to, a song, an album, a newspaper article, a game, a software application, an image, a video clip, a digitized motion picture, a 3-D video, or some combination thereof.

The customer 125 may then use the customer application 340 to issue an instruction indicating an intention to obtain use, or possession, of 355 the item. This instruction may be issued by an action such as, but not limited to, a single click of a button displayed on the vendor website 325, tapping a touch screen at a location indicative of the item, speaking a particular word or phrase, entering a code, or some combination thereof. As with all other inter-module or inter-machine communications, these transactions, may, in a preferred embodiment, be suitably encrypted, preferably with one of the well-known methods of public key encryption that are widely applied in, for instance, the banking software industry.

Step 2002: Customer application triggered to send customer identifier to vendor application. In this step, a vendor application 315 running on the vendor server 115 may issue an instruction 450 to the customer application 340 to obtain a customer-identifier 130 that may be stored on the customer device 150. This customer-identifier 130 may for instance be a number of a code such as, but not limited to, a customer account number or identifier created when establishing the customer-account 350, a make and/or model number of the customer device 150 or some combination thereof.

Step 2003: Vendor application relays customer identifier and sends vendor identifier and customer-selected item identifier to account application.

In this step, the vendor application 315 running on the vendor server 115 may automatically take the customer-identifier 130 obtained in step 2003, combine it with a customer-identifier 130 and a customer-selected-item identifier 330 and relay all this information on to the accounting application 310 in a suitably encrypted form as a vendor submission 120.

The vendor-identifier 320 may, for instance, be a number or a tag such as, but not limited to, a unique vendor identification number or code issued during the vendor registration process, an identification number and/or make and model number of the vendor server 115, a Uniform Resource Locator (URL) of, for instance, one or more of the vendor's websites, or some combination thereof.

The customer-selected-item identifier 330 may, for instance, be a number or a code such as, but not limited to, a Uniform Resource Locator (URL) of the item on the vendor's website, an International Standard Recording Code (ISRC), a Universal Product Code (UPC), a Stock-keeping Unit (SKU), an item price, an encrypted item price or some combination thereof. The customer-selected-item identifier 330 may also include an alpha-numeric key such as, but not limited to, a title, a written description, a hash code, or some combination thereof, that may be required to match another part of the customer-selected-item identifier 330. The file containing this information may, for instance, be of any suitable file type, file size and may, for instance, be downloaded to the customer device, stored in a cloud storage facility, streamed on a one time basis, or some combination thereof.

The accounting application 310 may then check a status 365 of the customer-account 350 to ascertain if the customer 125 has sufficient credit to undertake the transaction of acquiring the customer-selected-item.

Step 2004: Notify vendor and customer of failure. If checking a status 365 of the customer-account 350 fails, the accounting application 310 may then notify both the customer and the vendor by transmitting 395 an error message 410 to the vendor application, and transmitting 420 the same, or similar, error message 410 to the customer application. The accounting application 310 may then return to Step 2000, waiting for another vendor submission 120.

Step 2005: Account application conditionally debits customer account, and conditionally credits vendor accounts. If checking a status 365 of the customer-account 350 succeeds, the accounting application 310 may then proceed to conditionally debit a customer account 375 by a first monitory amount 360 and to conditionally credit 370 a vendor account 385 by a second monitory amount 380.

In a preferred embodiment, the first monitory amount 360 may be reflective of the offering price of the customer-selected-item as, for instance, displayed, or indicated, by the vendor website 325. The first monitory amount 360 may also include any appropriate, associated cost such as, but not limited to, state or federal taxes, including sales taxes, costs of shipping, or other related costs of handling the transaction, or some combination thereof.

The second monitory amount 380 may, for instance, be equal to the first monitory amount 360.

Step 2006: Notify vendor of success and receive notification from customer of success.

In this step, the accounting application 310 may first issue a transaction confirmation 170 to the vendor application 315.

The vendor application 315 may then confer 430 pre-determined usage rights 180 to the customer application 340. The pre-determined usage rights 180 may include contractual arrangements pertaining to the customer 125, or to a third party, such as, but not limited to, purchase of the item, a right to download the item from a content provider 480 onto one or more customer device 150, a one-time right to use, listen to, or watch the content 470, a time-limited lease of the content, to have the customer-selected-item shipped to the customer or to a third party or some combination thereof.

Once the customer 125, or a third party to whom they have conferred the rights to, have exercised their usage rights by taking an action such as, but not limited to, downloading the content from the content provider 480 or from the vendor website 325, or using, listening to or watching the content, the customer device 150 may send a confirmation message directly to the accounting application 310. In an alternate, preferred embodiment, the content provider 480 may also, or instead, send a confirmation message to the accounting application 310, either directly or via the vendor application 315. Since Internet, and other network, services and facilities may not always be reliable for reasons such as, but not limited to, connections stalling, software timing out, noise on transmission line, or some combination thereof. In order to ensure reliable information transfer, a preferred embodiment of this invention will, as is typical practice in the computer communications industry, incorporate suitable confirmation and error checking technology such as, but not limited to, a bit or a hash-function checking algorithm that may, for instance, confirm that a size of a downloaded file matches the files size description that may be contained in the customer selected item identifier (CSII).

Once the application on the customer device has satisfactorily determined that delivery has been completed according to the data specifications that may be part of the CSII, it may then signal both the vendor and accounting server to make the conditional debit final. The conditional debit/credit may, for instance, stay in a volatile RAM buffer waiting for such confirmation. If confirmation is not received, the transaction may time out and an error message may result.

Having received one or more confirmation messages, the accounting application 310 may then automatically check to see if it is time to reconcile the accounts. Reconciling 440 the accounts may be done on a schedule such as, but not limited to, a periodic time basis, where the time may be one or more seconds, minutes, hours, days, weeks, months, years or some combination thereof. The reconciliation schedule may also, or instead, be based on a number of transactions, occurring in one or more accounts, an amount of credit remaining in one or more accounts, or some combination thereof. The reconciliation may be synchronized so that all accounts are reconciled essentially at the same time, or reconciliations may be done by individual accounts or a group of accounts and may be, but is not limited to, being synchronized so that all accounts are reconciled at a fixed period of time such as, but not limited to, a number of seconds, minutes, hours, days, weeks, months, years or some combination thereof.

Step 2008: Assess and deduct service fees, distribute payment to vendors, receive payment from customers. In this step, having reconciled one or more accounts, the accounting application 310 may automatically, or be instructed to, calculate and add or deduct any service fees that may be due on any of the accounts. By accessing any service fees on the reconciled accounts and not on individual transactions, customer and vendor transaction statements may all list the same price for each item transacted, simplifying any reconciliation between them that may become necessary. Having fees only assessed after reconciliation and at or on disbursement of any monies due may also avoid having the system deal with fractions of monetary units and may also create greater flexibility for providing or adjusting terms of service with one or more vendors.

Having reconciled one or more accounts, and made appropriate adjustments for fees such as, but not limited to, service fees charged to vendors, the accounting application 310 may automatically, or be instructed to make payments, or disbursements, to one or more accounts. Such payments may, for instance, be made via a third party such as, but not limited to, a bank, a credit card company, a credit union or some combination thereof.

As all the micro-payments due to a particular vendor have been reconciled into a single payment, if this payment is made via a credit-card company, only one per-transaction fee will be charged. The per-transaction fee has, therefore, been spread over all the micro-transaction. If the periods between reconciliations are such that a large number of micro-transactions are covered by the single payment, the percentage effect of the per-transaction fee on each micro-transaction may become negligible, allowing micro-transactions of any size to be profitable as long as enough transactions are bundled together at the reconciliation of accounts.

In addition to performing the reconciliation after a period of time, the reconciliations could occur after one or more accounts has seen a pre-determined number of transactions, or the cumulative value of transactions of one or more accounts has reached a pre-determined value, or some combination thereof.

FIG. 3 shows a schematic of one embodiment of a computer enabled method for facilitating micropayments of the present invention.

In particular, FIG. 3 shows certain of the components necessary for a preferred embodiment of the present invention.

For instance, the interactions of the customer application 340 running on the customer device 150 with the accounting application 310 running on the accounting server 110 shown include the interaction of establishing a customer account 335 and the transmission 420 of an error message 410 back to the customer application.

FIG. 3 also shows how the customer application 340 may interact directly with the content provider 480 to obtain content 470, as well as indirectly over a public communications network 140 as shown in FIG. 1.

The interaction of the customer application 340 with both the vendor website 325 and the vendor application 315 both of which may be running on, or hosted by, the vendor server 115. In particular, the transmission from the customer application 340 of an instruction 355 to the vendor website 325 indicating an intention to obtain use of a customer-selected-item is shown. Also the vendor application 315 obtaining 450 a customer-identifier 130, directly or, as shown in FIG. 1, via a public communications network 140, and the vendor application 315 conferring 430 pre-determined usage rights to the customer application 340.

Interactions of the vendor application 315 running on the vendor server 115 that are shown in FIG. 3 include establishing a vendor account 345, sending a vendor submission 120, receiving 395 an error message if the transaction in the vendor submission cannot be completed, or receiving a transaction confirmation 170 if it can be completed.

FIG. 3 also shows the possible mutual interaction 500 between the vendor application 315 and the content provider 480 that may be used, for instance, for sale verification and the exchange of payments.

FIG. 3 also shows the interaction of the accounting application 310 with the customer-accounts 350 and the vendor account 385, either, or both, of which may be located on a server or other suitable computer hardware that may be remote to the accounting server 110. These interactions include checking a status 365 of a customer-account 350, conditionally debiting a customer account 375 by a first monitory amount and conditionally crediting 370 a vendor account 385 by a second monitory amount. FIG. 3 also shows the accounting application 310 periodically reconciling 440 accounts.

The computer enabled system and method for facilitating micropayments 100 may also be useful in charging and paying for distribution of services. For instance, bit-torrent and magnet distribution systems are well-known methods of distributing large data files that is currently growing in use. Both of these systems require at least some of the participants to act both as receivers and distributers of digital data. The micropayment system of this invention may be used, for instance, to make such distribution systems more profitable and accepted by both charging users for receiving data, and rewarding users for distributing data.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A method for facilitating micropayments, comprising:
   a user establishing, via a processor on a user device, an account with a billing server, wherein the account includes at least a username and a password having numerical portions and letter portions;
   the billing server generating a polynomial equation having a plurality of coefficients and a plurality of variables, wherein the plurality of coefficients corresponds to the numerical portions of the password;
   storing, via the billing server, the polynomial equation in a machine-readable non-transitory memory of the billing server;
   embedding, by the user device, the polynomial equation into a software application stored in a machine-readable non-transitory memory of the user device;
   the user selecting, using the software application, one or more items to be purchased in at least one transaction from a vendor server;
   sending, by the vendor server, a time stamp to the user device;
   inputting, into the software application and via the processor on the user device, numerical portions of the time stamp into the polynomial equation to replace the plurality of variables;
   in response to inputting the numerical portions of the time stamp, generating, by the processor on the user device, a first solution to the polynomial equation;
   sending, by the processor on the user device, the first solution to the vendor server;
   the vendor server forwarding the solution and the time stamp to the billing server;
   solving, by the billing server, the polynomial equation to obtain a second solution;
   comparing, by the billing server, the first solution and the second solution;
   determining that the first solution is equivalent to the second solution; and
   in response to determining that the first solution is equivalent to the second solution, authorizing, by the billing server, the at least one transaction to be completed.

2. The method of claim 1 wherein said numerical portions of said time stamp comprises a year, month, day, hour, minute, and second.

3. The method of claim 1 further comprising the step of:
   periodically reconciling, by the billing server, the account of the user after a predetermined number of transactions associated with the account of the user have occurred.

4. The method of claim 1 wherein the numerical portions of the password comprise at least five numerals and the letter portions of the password comprise at least five characters.

* * * * *